US011465282B2

(12) United States Patent
Pholsiri

(10) Patent No.: US 11,465,282 B2
(45) Date of Patent: Oct. 11, 2022

(54) SYSTEM AND METHOD FOR MULTI-GOAL PATH PLANNING

(71) Applicant: Teradyne, Inc., North Reading, MA (US)

(72) Inventor: Chalongrath Pholsiri, Round Rock, TX (US)

(73) Assignee: Teradyne, Inc., North Reading, MA (US)

(*) Notice: Subject to any disclaimer, the term of this patent is extended or adjusted under 35 U.S.C. 154(b) by 307 days.

(21) Appl. No.: 16/113,320

(22) Filed: Aug. 27, 2018

(65) Prior Publication Data

US 2020/0061824 A1     Feb. 27, 2020

(51) Int. Cl.
*G05B 15/00* (2006.01)
*G05B 19/00* (2006.01)
*B25J 9/16* (2006.01)

(52) U.S. Cl.
CPC .......... *B25J 9/1666* (2013.01); *B25J 9/1669* (2013.01); *B25J 9/1671* (2013.01); *G05B 2219/40369* (2013.01); *G05B 2219/40448* (2013.01); *G05B 2219/45066* (2013.01)

(58) Field of Classification Search
CPC ...... B25J 9/1666; B25J 9/1669; B25J 9/1671; G05B 2219/40369; G05B 2219/45066; G05B 2219/40448
See application file for complete search history.

(56) References Cited

U.S. PATENT DOCUMENTS

| | | | | |
|---|---|---|---|---|
| 9,895,803 | B1* | 2/2018 | Oslund | B25J 9/1666 |
| 9,925,662 | B1* | 3/2018 | Jules | G05B 19/423 |
| 11,072,070 | B2* | 7/2021 | Seno | B25J 9/06 |
| 2010/0168950 | A1* | 7/2010 | Nagano | B25J 9/1666 701/25 |
| 2012/0024605 | A1* | 2/2012 | Elinas | G06Q 10/06 175/57 |
| 2016/0026747 | A1* | 1/2016 | Garaas | G05B 19/40937 716/135 |
| 2018/0059029 | A1* | 3/2018 | Yeum | G01N 21/8806 |
| 2019/0015981 | A1* | 1/2019 | Yabushita | B25J 9/1664 |
| 2019/0035096 | A1* | 1/2019 | Huang | B25J 19/023 |
| 2019/0184561 | A1* | 6/2019 | Yip | B25J 9/161 |

(Continued)

OTHER PUBLICATIONS

"Robot Path Planning using Dynamic Programming with Accelerating Nodes" by Rahul Kala, Anupam Shukla, Ritu Tiwari; PALADYN Journal of Behavioral Robotics (Year: 2011).*

(Continued)

*Primary Examiner* — Abby Y Lin
*Assistant Examiner* — Sohana Tanju Khayer
(74) *Attorney, Agent, or Firm* — Mark H. Whittenberger, Esq.; Holland & Knight LLP

(57) ABSTRACT

A method and computing system comprising identifying a plurality of robot configurations for each inspection point of a plurality of inspection points of a problem. A graph may be generated with each feasible robot configuration as a node on the graph. A distance may be calculated between a pair of feasible robot configurations. A shortest complete path connecting each node on the graph may be obtained based upon, at least in part, the distance between the pair of feasible robot configurations.

34 Claims, 10 Drawing Sheets

(56) References Cited

U.S. PATENT DOCUMENTS

2020/0050215 A1* 2/2020 Kessler ............... G05D 1/0246

OTHER PUBLICATIONS

"A Dynamic Path Planning Method for Social Robots in the Home Environment" by Chen Zhang 1,2, Lelai Zhou, Yibin Li and Yong Fan; (Year: 2020).*

"Extended rapidly exploring random tree-based dynamic path planning and replanning for mobile robots" by Devin Connell and Hung Manh La; International Journal of Advanced Robotic Systems (Year: 2018).*

* cited by examiner

SYSTEM AND METHOD FOR MULTI-GOAL PATH PLANNING

TECHNICAL FIELD

The invention generally relates to robotics and more specifically to robotic inspection systems.

BACKGROUND

The ability for robotic inspection systems to efficiently inspect an article or part may be limited by the path between poses or robotic configurations required for multiple inspection points. Previous attempts to plan paths between robot configurations have been limited to manual processes. For example with current implementations, when there's a part that needs inspection, a person needs to go in and manually generate a path that can inspect all the specified features on the part. Embodiments of the present disclosure may automate conventional approaches and remove humans from the loop, thus reducing both the time and cost, while supporting multiple threads and parallelization.

SUMMARY OF DISCLOSURE

In one implementation, a computer-implemented method for identifying a plurality of robot configurations for each inspection point of a plurality of inspection points of a problem. A graph may be generated with each feasible robot configuration as a node on the graph. A distance may be calculated between a pair of feasible robot configurations. A shortest complete path connecting each node on the graph may be obtained based upon, at least in part, the distance between the pair of feasible robot configurations.

One or more of the following features may be included. At least a subset of the plurality of inspection points may be grouped into a plurality of groups of inspection points. Grouping the at least a subset of the plurality of inspection points may occur prior to generating the graph. Identifying the plurality of feasible robot configurations for each inspection point may include identifying a plurality of feasible robot configurations for each group of inspection points. Identifying plurality of feasible robot configurations for each group of inspection points may be performed in parallel. Identifying the plurality of feasible robot configurations for each group of inspection points may be performed using multiple threads. Calculating the distance may comprise identifying a pair of robot configurations that can be directly connected without collisions. Calculating the distance may comprise calculating a distance between the pair of robot configurations that can be directly connected without collisions. Calculating the distance may comprise generating a connection between the pair of nodes associated with the pair of robot configurations that can be directly connected without collisions. Calculating the distance may comprise identifying a pair of robot configurations that cannot be directly connected without a collision. Calculating the distance may comprise generating an artificial distance between the pair of nodes associated with the plurality of robot configurations that cannot be directly connected without collisions. Calculating the distance may comprise generating a connection between the pair of nodes associated with the plurality of robot configurations that cannot be directly connected without collisions. A visit order may be obtained from the shortest complete path. At least one node may be removed from the graph that is not directly connected to either of a plurality of neighbor nodes. The plurality of neighboring nodes may be connected on the graph. The at least one removed node may be re-inserted after a plurality of candidate nodes. A path planning methodology may be applied to obtain a path between a plurality of neighboring nodes that are not directly connected. The path planning methodology may be a rapidly exploring random tree ("RRT") methodology. Obtaining the shortest complete path may comprise applying a traveling salesman problem ("TSP") methodology based upon, at least in part, the graph. The problem may be associated with an automotive application or a printed circuit board. The distance between the pair of feasible robot configurations may be a measurement of time.

In another implementation, a computing system includes a processor and memory is configured to perform operations including identifying a plurality of robot configurations for each inspection point of a plurality of inspection points of a problem. A graph may be generated with each feasible robot configuration as a node on the graph. A distance may be calculated between a pair of feasible robot configurations. A shortest complete path connecting each node on the graph may be obtained based upon, at least in part, the distance between the pair of feasible robot configurations.

One or more of the following features may be included. At least a subset of the plurality of inspection points may be grouped into a plurality of groups of inspection points. Grouping the at least a subset of the plurality of inspection points may occur prior to generating the graph. Identifying the plurality of feasible robot configurations for each inspection point may include identifying a plurality of feasible robot configurations for each group of inspection points. Identifying plurality of feasible robot configurations for each group of inspection points may be performed in parallel. Identifying the plurality of feasible robot configurations for each group of inspection points may be performed using multiple threads. Calculating the distance may comprise identifying a pair of robot configurations that can be directly connected without collisions. Calculating the distance may comprise calculating a distance between the pair of robot configurations that can be directly connected without collisions. Calculating the distance may comprise generating a connection between the pair of nodes associated with the pair of robot configurations that can be directly connected without collisions. Calculating the distance may comprise identifying a pair of robot configurations that cannot be directly connected without a collision. Calculating the distance may comprise generating an artificial distance between the pair of nodes associated with the plurality of robot configurations that cannot be directly connected without collisions. Calculating the distance may comprise generating a connection between the pair of nodes associated with the plurality of robot configurations that cannot be directly connected without collisions. A visit order may be obtained from the shortest complete path. At least one node may be removed from the graph that is not directly connected to either of a plurality of neighbor nodes. The plurality of neighboring nodes may be connected on the graph. The at least one removed node may be re-inserted after a plurality of candidate nodes. A path planning methodology may be applied to obtain a path between a plurality of neighboring nodes that are not directly connected. The path planning methodology may be a rapidly exploring random tree ("RRT") methodology. Obtaining the shortest complete path may comprise applying a traveling salesman problem ("TSP") methodology based upon, at least in part, the graph. The problem may be associated with an automotive application or a printed circuit board. The distance between the pair of feasible robot configurations may be a measurement of time.

The details of one or more implementations are set forth in the accompanying drawings and the description below. Other features and advantages will become apparent from the description, the drawings, and the claims.

BRIEF DESCRIPTION OF THE DRAWINGS

For a better understanding of the nature and objects of the present invention, reference is made to the following detailed description taken in conjunction with the following drawings, in which.

DETAILED DESCRIPTION OF THE PREFERRED EMBODIMENTS

Figure 1:
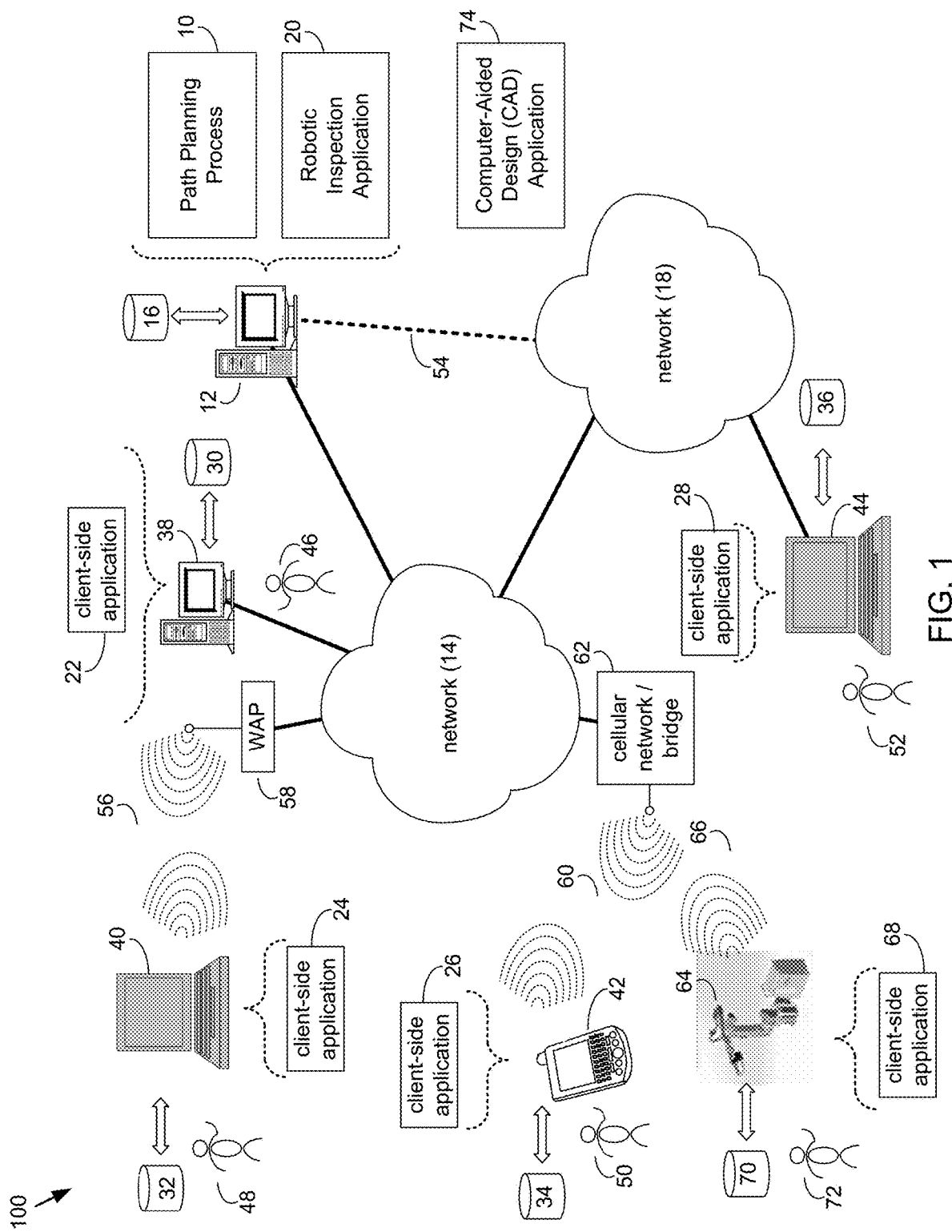
FIG. 1 is a diagrammatic view of a path planning process coupled to a distributed computing network.
Figure 2:
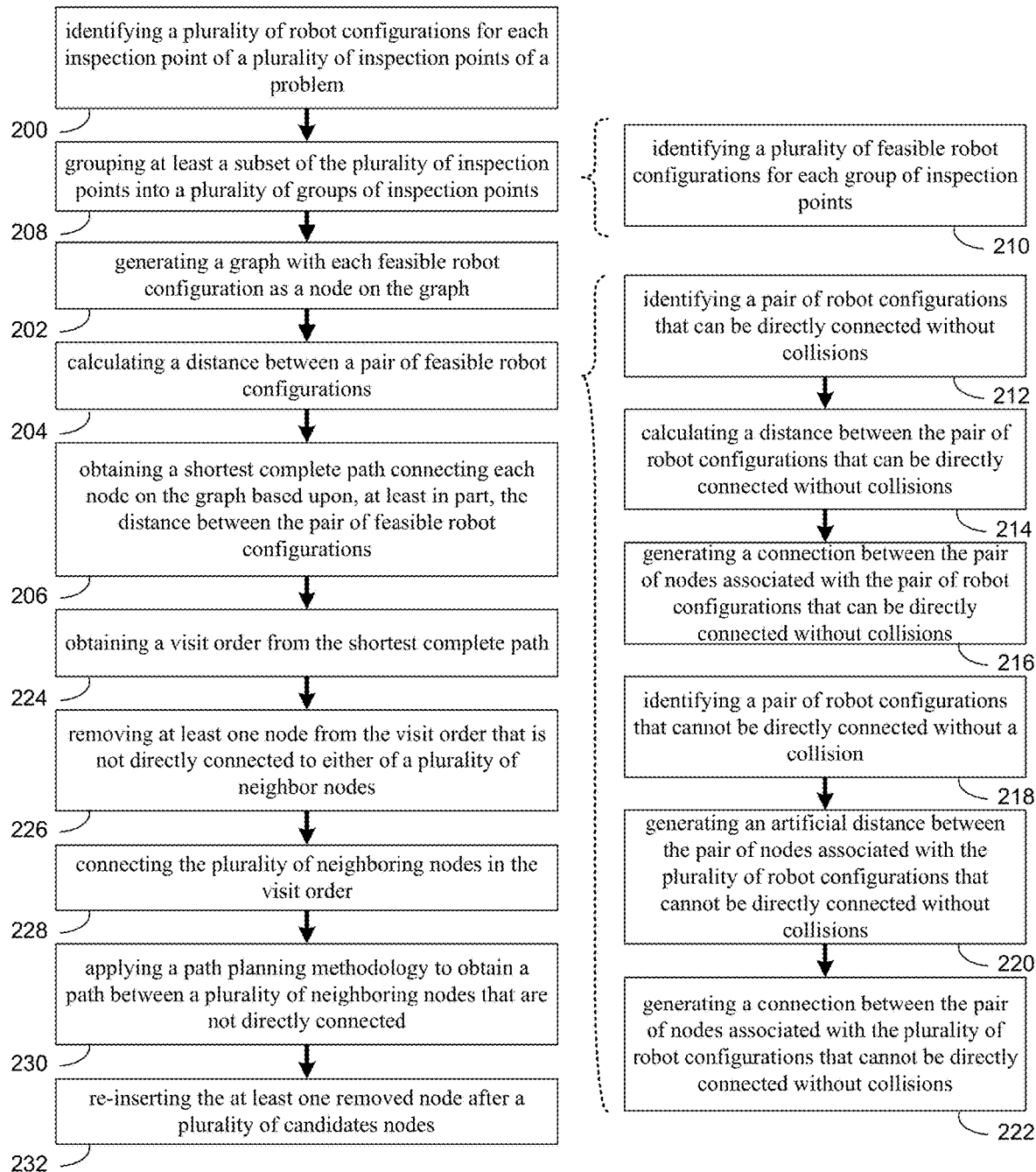
FIG. 2 is a flow chart of one implementation of the path planning process of FIG. 1.

Referring now to FIG. 1, there is shown path planning process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a path planning process, such as path planning process 10 of FIG. 1, may identify a plurality of robot configurations for each inspection point of a plurality of inspection points of a problem. A graph may be generated with each feasible robot configuration as a node on the graph. A distance may be calculated between a pair of feasible robot configurations. A shortest complete path connecting each node on the graph may be obtained based upon, at least in part, the distance between the pair of feasible robot configurations.

The instruction sets and subroutines of path planning process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Path planning process 10 may be a stand-alone application that interfaces with an applet/application that is accessed via client applications 22, 24, 26, 28, 66. In some embodiments, path planning process 10 may be, in whole or in part, distributed in a cloud computing topology. In this way, computing device 12 and storage device 16 may refer to multiple devices, which may also be distributed throughout network 14 and/or network 18.

Computing device 12 may execute a robotic inspection application (e.g., robotic inspection application 20), examples of which may include, but are not limited to, Actin® Software Development Kit from Energid Technologies of Cambridge, Mass. Path planning process 10 and/or robotic inspection application 20 may be accessed via client applications 22, 24, 26, 28, 68. Path planning process 10 may be a stand-alone application, or may be an applet/application/script/extension that may interact with and/or be executed within robotic inspection application 20, a component of robotic inspection application 20, and/or one or more of client applications 22, 24, 26, 28, 68. Robotic inspection application 20 may be a stand-alone application, or may be an applet/application/script/extension that may interact with and/or be executed within path planning process 10, a component of path planning process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of path planning process 10 and/or robotic inspection application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of path planning process 10 (and vice versa). Accordingly, path planning process 10 may be a purely server-side application, a purely client-side application, or a hybrid server-side/client-side application that is cooperatively executed by one or more of client applications 22, 24, 26, 28, 68 and/or path planning process 10.

One or more of client applications 22, 24, 26, 28, 68 may be configured to effectuate some or all of the functionality of robotic inspection application 20 (and vice versa). Accordingly, robotic inspection application 20 may be a purely server-side application, a purely client-side application, or a hybrid server-side/client-side application that is cooperatively executed by one or more of client applications 22, 24, 26, 28, 68 and/or robotic inspection application 20. As one or more of client applications 22, 24, 26, 28, 68 path planning process 10, and robotic inspection application 20, taken singly or in any combination, may effectuate some or all of the same functionality, any description of effectuating such functionality via one or more of client applications 22, 24, 26, 28, 68 path planning process 10, robotic inspection application 20, or combination thereof, and any described interaction(s) between one or more of client applications 22, 24, 26, 28, 68 path planning process 10, robotic inspection application 20, or combination thereof to effectuate such functionality, should be taken as an example only and not to limit the scope of the disclosure.

Users 46, 48, 50, 52 may access computing device 12 and path planning process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Path planning process 10 may include one or more user interfaces, such as browsers and textual or graphical user interfaces, through which users 46, 48, 50, 52 may access path planning process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, robotic inspection system 64 may be wirelessly coupled to network 14 via wireless communication channel 66 established between client electronic device 42 and cellular network/bridge 62, which is shown directly coupled to network 14. Storage device 70 may be coupled to audio recording system 64 and may include but is not limited to: hard disk drives; flash drives, tape drives; optical drives; RAID arrays; random access memories (RAM); and read-only memories (ROM). User 72 may access computing device 12 and path planning process 10 (e.g., using one or more of audio recording system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-10, path planning process 10 may identify 200 a plurality of robot configurations for each inspection point of a plurality of inspection points of a problem. A graph may be generated 202 with each feasible robot configuration as a node on the graph. A distance may be calculated 204 between a pair of feasible robot configurations. A shortest complete path connecting each node on the graph may be obtained 206 based upon, at least in part, the distance between the pair of feasible robot configurations.

In some implementations, a method, computer product, and system are presented for multi-goal path planning of robotic vision inspection systems. In some implementations, a robotic inspection system (e.g., robotic inspection system 64) may be used to inspect articles or manufactured goods built, welded, painted, or otherwise modified by human and/or robotic assembly lines. To facilitate inspection of each product, the robotic vision system may be communicatively coupled to a computing device with a robotic inspection application (e.g., robotic inspection application 20).

As will be discussed in greater detail below, the ability for robotic inspection systems to efficiently inspect an article or part may be limited by the path between poses or robotic configurations required for a plurality of inspection points. Previous attempts to plan paths between robot configurations for inspecting a plurality of inspection points have been limited to manual processes. For example with current implementations, when there's a part that needs inspection, a person needs to go in and manually generate a path that can inspect all the specified features on the path. Embodiments of the present disclosure may automate conventional approaches and remove humans from the loop, thus reducing both the time and cost.

Additionally, conventional path planning approaches run in a single thread. For example, conventional path planning processes insert an inspection point or goal, one at a time. For each insertion, a few neighbor goals (already in the path) are chosen. The new goal is connected to each of those neighbors as well as the goal after each neighbor in the path. The connection with the shortest path is then selected. However and as will be discussed in greater detail below, conventional path planning processes do not support parallelization.

In some implementations, path planning process 10 may identify 200 a plurality of robot configurations for each inspection point of a plurality of inspection points of a problem. As discussed above, a plurality of inspection points may be defined for an article or a part. The task of inspecting the plurality of inspection points via a robotic inspection system may generally be a "problem" and a robot configuration for inspecting an inspection point may be a "solution" to the "problem". Problems may generally be associated with an automotive application, a printed circuit board (PCB), other manufactures, or parts.

Figure 3:
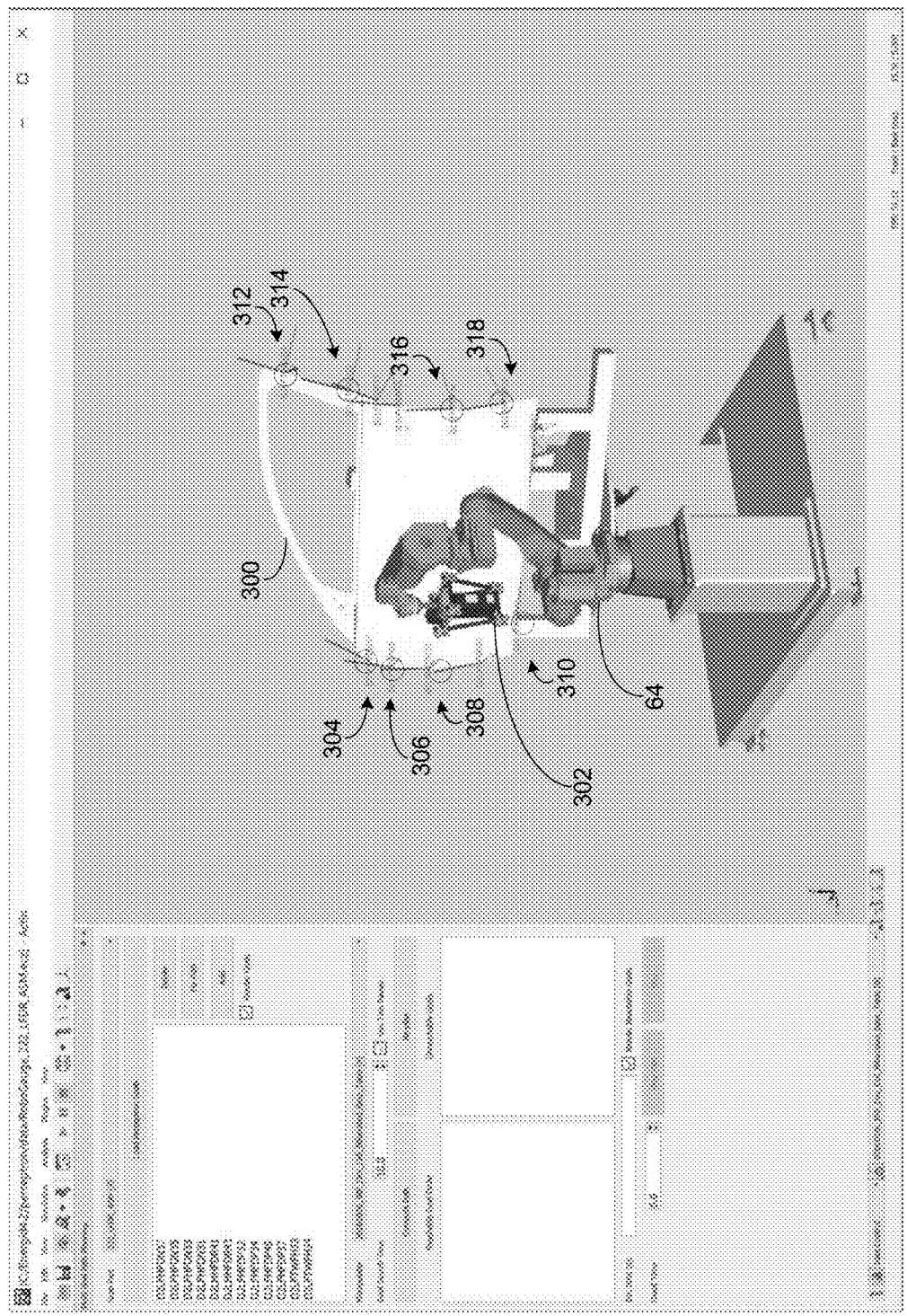
FIG. 3 is a diagrammatic view of a robotic inspection system and a plurality of inspection points to be inspected, according to one implementation of the path planning process of FIG. 1.

Referring also to the example of FIG. 3 and in some implementations, suppose a vehicle door (e.g., vehicle door 300) is produced by an assembly line. Robotic inspection system 64 may be utilized to inspect various portions of the vehicle door (e.g., vehicle door 300) for quality assurance testing, threshold testing, etc. In some implementations, robotic inspection system 64 may include a robotic arm coupled to a robotic vision system (e.g., robotic vision system 302). In some implementations, the robotic vision system (e.g., robotic vision system 302) may include a camera system communicatively coupled to a computing device. In some implementations, a robotic inspection application may define a plurality of inspection points on the vehicle door. The plurality of inspection points (e.g., inspection points 304, 306, 308, 310, 312, 314, 316, 318) may define areas of interest in the vehicle door. In some implementations, the plurality of inspection points may be user-defined via the robotic inspection application (e.g., robotic inspection application 320). In some implementations, the plurality of inspection points (e.g., inspection points 304, 306, 308, 310, 312, 314, 316, 318) may be automatically defined by path planning process 10. For example and in some implementations, the plurality of inspection points (e.g., inspection points 304, 306, 308, 310, 312, 314, 316, 318) may include a list of positions for the robotic vision system to inspect.

In some implementations, path planning process 10 may identify 200 a plurality of robot configurations for each inspection point of a plurality of inspection points of a problem. For example, inspecting the plurality of inspection points may include posing or configuring the robotic inspection system and/or robotic vision system of the robotic inspection system in a plurality of pre-defined poses or robot configurations. For example, the robotic vision system may include a plurality of sensors, such as touch sensors, force sensors, joint encoders, accelerometers, gyroscopic sensors, color cameras, gray-level cameras, light detection and ranging (LIDAR) sensors, hyperspectral sensors, etc. These sensors of the robotic vision system may be oriented in particular robot configurations or poses to inspect a particular inspection point. In some implementations, the robotic inspection application may define one or more feasible or valid robot configurations for inspecting various portions of an article. From at least these defined poses or robotic configurations, path planning process 10 may identify 200 all feasible robot configurations for each inspection point. For example, path planning process 10 may directly read the plurality of robot configurations (e.g., from plurality of XML files of a robotic inspection application (e.g., robotic inspection application 20) or CAD software (e.g., CAD Application 74)) and extract the inspection poses. In some implementations, at least a portion of the plurality of inspection points may not require full six degrees of constraint (i.e., translational and rotational about three axes). For example, if the inspection point is a hole, then the rotation around the axis normal to the hole's plane passing through the center of the hole does not matter. As such, an inspection point may have a plurality of feasible robot configurations based on the degrees of constraint associated with each inspection point.

In some implementations, at least one inspection point of the plurality of inspection points may be associated with at least one robotic link configuration. For example, a robotic link configuration may generally represent a feasible robot operation for a given inspection point. In some implementations, at least one inspection point of the plurality of inspection points may not be associated with a robotic link configuration. For example, there may be some inspection points that don't have associated feasible robot configurations (e.g. due to the point being out of reach, in collision, or other reasons).

In some implementations, path planning process 10 may group 208 at least a subset of the plurality of inspection points into a plurality of groups of inspection points. In some implementations, grouping 208 the at least a subset of the plurality of inspection points may occur prior to generating 202 the graph, as will be discussed in greater detail below. In some implementations, path planning process 10 may group 208 inspection points into a plurality of groups of inspection based upon, at least in part, one or more characteristics of the plurality of inspection points. For example, path planning process 10 may separate the inspection points into a plurality of groups of inspection points and, in each group, may sort the inspection points so they can be processed in an order within each group. In some implementations, a default grouping algorithm may make use of the feature, the location, and/or the normal vector of each inspection point to determine groupings and ordering. In some implementations, path planning process 10 may allow a user to create a user-defined grouping algorithm to use instead of a default grouping algorithm. Referring now to FIG. 3, inspection points 304, 306, 308, 310 may be grouped 208 in a first group while inspection points 312, 314, 316, and 318 may be grouped 208 in a second group. While two groups have been discussed in this example, it will be appreciated that any number of groups may be formed or defined from the plurality of inspection points within the scope of the present disclosure. In some implementations, proximate inspection points may be grouped 208 together based upon, at least in part, a threshold distance between inspection points.

In some implementations, identifying 200 the plurality of feasible robot configurations for each inspection point may include identifying 210 a plurality of feasible robot configurations for each group of inspection points. For example and for each group, a feasible robot configuration may be generated or identified for each inspection point in order using a seed robot configuration. For the first point in a group, the seed configuration may be the "home" or starting position. For subsequent points, the seed configuration may be the valid or feasible robot configuration of the previous inspection point. Since a feasible robot configuration of the current inspection point may depend on a feasible robot configuration of the previous point in the group, this process may be performed in a single thread. In some implementations, inspection points without valid or feasible robot configurations may be discarded by path planning process 10.

In some implementations, identifying 210 the plurality of feasible robot configurations for each group of inspection points may be performed in parallel. As discussed above, since a feasible robot configuration of a given inspection point depends on that of the previous inspection point in the group, this process is performed in a single thread. However, the plurality of feasible robot configurations may be identified 210 for a group of inspection points in parallel. For example, robot configurations for multiple groups may be performed in parallel. In some implementations, identifying 210 the plurality of feasible robot configurations for each group of inspection points may be performed using multiple threads. For example, the identification 210 of a plurality of feasible robot configurations for a first group of inspection nodes may be performed on a first thread and the identification 210 of a plurality of feasible robot configurations for a second group of inspection nodes may be performed on a second thread. It will be appreciated that a plurality of feasible robot configurations for multiple groups may be identified in parallel in various configurations using multiple threads within the scope of the present disclosure.

Figure 4:
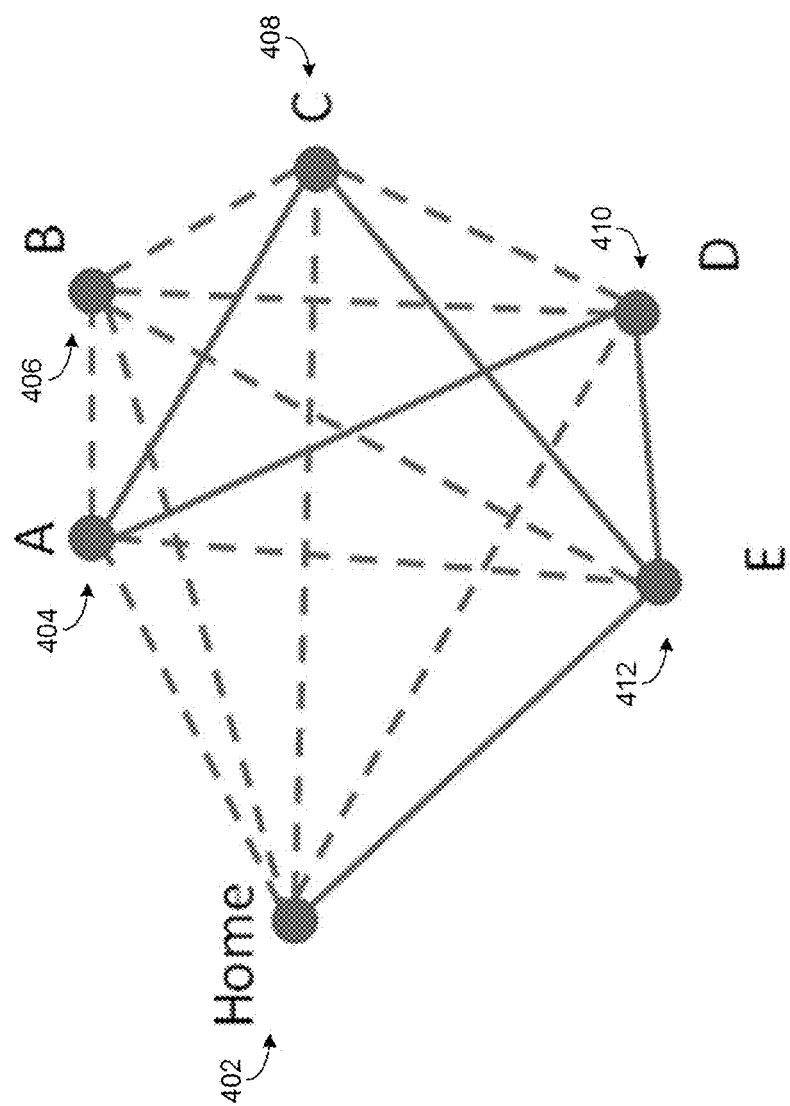
FIGS. 4-8 are diagrammatic views of graphs of nodes representative of robot configurations generated according to implementations of the path planning process of FIG. 1.
Figure 5:
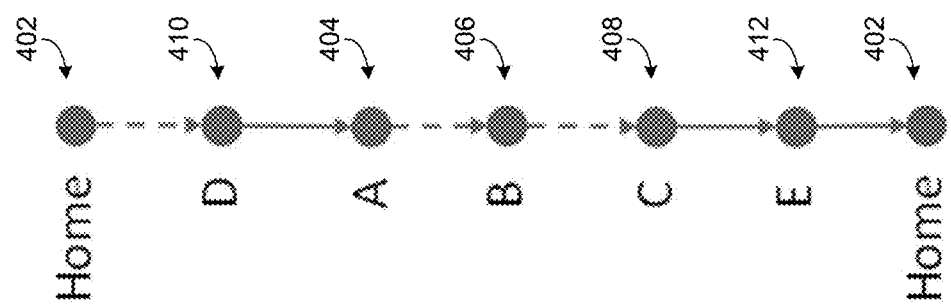

In some implementations, path planning process 10 may generate 202 a graph with each feasible robot configuration as a node on the graph. In some implementations, path planning process 10 may generate 202 a complete (i.e., fully connected) graph. As will be discussed in greater detail below, such a fully connected graph may be used by path planning algorithms to obtain a shortest complete path. In some implementations, path planning process 10 may generate 202 a graph with each robot configuration of the plurality of robot configurations, including the "home" or initial configuration, as nodes. For example and as shown in FIG. 4, path planning process 10 may generate 202 a graph (e.g., graph 400) to include a plurality of nodes (e.g., node Home 402, node A 404, node B 406, node C 408, node D 410, node E 412) representative of a plurality of robot configurations for a plurality of inspection points. In some implementations, the "home" or initial robot configuration may not be associated with an inspection point. For example, node Home 402 may indicate where a robotic inspection system begins inspecting a plurality of inspection points. In some implementations, node Home 402 may be associated with an inspection point.

In some implementations, path planning process 10 may calculate 204 a distance between a pair of feasible robot configurations. In some implementations, path planning process 10 may calculate 204 a distance between any pair of robot configurations. In some implementations, the distance may be a measurement of time that represents the time required to traverse from one inspection point to another by the robotic inspection system. As will be discussed in greater detail below, path planning process 10 may calculate the distance between robot configurations in terms of a proximity measure. However, it will be appreciated that the distance between robot configurations may be calculated in variety of ways.

In some implementations, calculating 204 the distance may include identifying 212 a pair of robot configurations that can be directly connected without collisions. A collision may generally include a predicted collision of at least a portion the robotic vision system with itself and/or an external structure if the robotic inspection system were to orient the robotic vision system in a particular orientation to inspect a given inspection point. In some implementations, calculating 204 the distance may include calculating 214 a distance between the pair of robot configurations that can be directly connected without collisions. In some implementations, the distance between the pair of robot configurations may be calculated 214 using the maximum of the differences of joint values and/or the maximum of the weighted differences of the joint values. It will be appreciated that the distance between pairs of robot configurations may be calculated in various ways.

In some implementations, calculating 204 the distance may include generating 216 a connection between the pair of nodes associated with the pair of robot configurations that can be directly connected without collisions. For example and referring also to FIG. 4, path planning process 10 may generate 216 a connection between each pair of nodes associated with the pair of robot configurations that can be directly connected without collisions. In this example, path planning process 10 may generate 216 connections (e.g., solid lines) on the graph (e.g., graph 400) between node A 404 and node C 408, node A 404 and node D 410, node C 408 and node E 412, node D 410 and node E 412, and node E 412 and node Home 402. In this example, the solid lines may represent the connections between the robot configurations associated with these nodes that may be connected directly without collisions. While a solid line is used to represent these direct connections without collisions, it will be appreciated that various annotations may be used within the scope of the present disclosure. In some implementations, the distance between the pair of robot configurations may be associated with the connection generated 216 between the pair of nodes on the graph.

In some implementations, calculating 204 the distance may include identifying 218 a pair of robot configurations that cannot be directly connected without a collision. As discussed above, a collision may generally include a predicted collision of at least a portion the robotic vision system with itself and/or an external structure if the robotic inspection system were to orient the robotic vision system in a particular orientation to inspect a given inspection point. In some implementations, path planning process 10 may identify 218 a pair of robot configurations that cannot be connected without collisions. In some implementations, calculating 204 the distance may include generating 220 an artificial distance between the pair of nodes associated with the plurality of robot configurations that cannot be directly connected without collisions. For example, for "non-connected" pair of robot configurations (for example, due to obstacle, collision etc.), path planning process 10 may generate 220 an artificially "large" distance on the link as a penalty for connections between robot configurations with a collision. In some implementations, the generated artificial distance may represent the distance required to overcome the collision and yet still provide a path between the pair of robot configurations.

In some implementations, calculating 204 the distance may include generating 222 a connection between the pair of nodes associated with the plurality of robot configurations that cannot be directly connected without collisions. In some implementations, these artificially large distances may be added to and/or associated with the edge values in the graph. As such, these nodes representative of robot configurations may be connected in the graph (e.g., graph 400) with one or more artificial connections. For example and referring again to FIG. 4, the one or more artificial connections may be represented as dashed lines in between nodes representative of the plurality of robot configurations. While dashed lines have been used in this example to represent connections between robot configurations with collisions, it will be appreciated that other kinds of markings or annotations may be used within the scope of the present disclosure to represent robot configurations that may not be connected without collisions on the graph.

In some implementations, path planning process 10 may obtain 206 a shortest complete path connecting each node on the graph based upon, at least in part, the distance between the pair of feasible robot configurations. As discussed above, with a fully connected graph, path planning process 10 may obtain 206 a shortest complete path connecting each robot configuration based upon the graph. In some implementations, the shortest complete path may start from a home node and visit each node once and then back to home.

In some implementations, obtaining 206 the shortest complete path may include applying a traveling salesman problem ("TSP") methodology based upon, at least in part, the graph. In some implementations, path planning process 10 may use a TSP (Traveling Salesman Problem) algorithm, such as algorithms with 2-opt method for iterative improvement. For example, some TSP algorithms require that edge weights (e.g., distances) obey the triangle inequality. In some implementations, especially where artificial distances are inserted, the edge weights of the graph may not obey the triangle inequality required by certain TSP algorithms. It will be appreciated that any TSP methodology or algorithm may be used within the scope of the present disclosure. In this manner, path planning process 10 may use a TSP algorithm to find a solution—a complete path connecting all connected robot configurations/goals.

In this manner, path planning process 10 may obtain 224 a visit order from the shortest complete path. For example and referring also to FIG. 5, a "visit order" may be determined from the shortest complete path. In this example, path planning process 10 may define a visit order beginning with node Home 402, node D 410, node A 404, node B 406, node C 408, node E 412, and returning to node Home 402. In this manner, the visit order (e.g., visit order 500) may define an order of robot configurations to complete the inspection of each inspection point. In some implementations, obtaining 224 the visit order may be performed by a single thread of a multiple thread configuration.

In some implementations, path planning process 10 may remove 226 at least one node from the visit order that is not directly connected to either of a plurality of neighbor nodes. In some embodiments where each node is directly connected to at least one of its neighboring nodes, no nodes may be removed. Referring also to the example of FIG. 6 and in some implementations, path planning process 10 may remove 226 nodes that are not directly connected to either of their neighbor nodes in the visit order. For example, node B 406 may have two indirect connections and node D 410 may have one indirect connection. Because node B 406 in this example is not directly connected to either of its neighboring nodes (e.g., node A 404 and node C 406), path planning process 10 may remove 226 node B 406 from the visiting order (e.g., visiting order 500). In some implementations, path planning process 10 may connect 228 the plurality of neighboring nodes on the graph. Referring also to the example of FIG. 6 and in some implementations, path planning process 10 may connect 228 node A 404 and node C 406 in response to removing 226 node B 406 because node B 406 had indirect connections with both of its neighboring nodes to generate a revised visit order (e.g., visit order 700).

Figure 6:
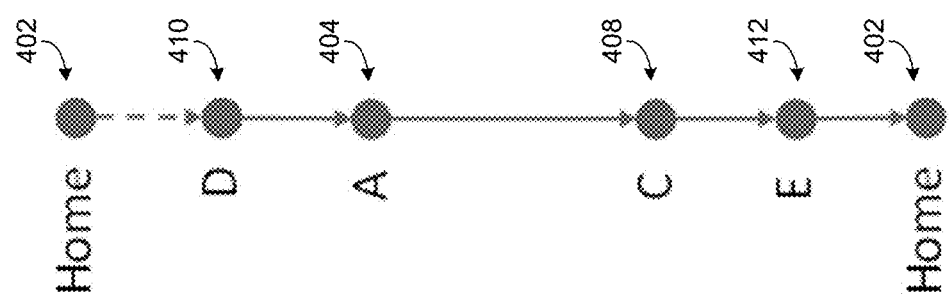

As discussed above, path planning process 10 may determine that the plurality of neighbor nodes can be directly connected and/or whether the plurality of neighboring nodes cannot be directly connected. In response to determining that the plurality of robot configurations associated with the plurality of neighbor nodes can be directly connected, path planning process 10 may calculate 214 the distance between the robot configurations and may generate 216 a connection between the plurality of neighboring nodes in the visit order as discussed above. In response to determining that the plurality of robot configurations represented by the plurality of neighboring nodes cannot be directly connected, path planning process 10 may generate 220 an artificial distance between the pair of nodes associated with the plurality of neighbor nodes and may generate 222 a connection between the plurality of neighbor nodes. In the example of FIG. 6, path planning process 10 may have previously identified 212 node A 404 and node C 408 as being capable of being directly connected (e.g., as shown in FIG. 4). Accordingly, path planning process 10 may calculate 214 the distance between node A 404 and node C 408 as discussed above and may generate 216 a connection between node A 404 and node C 408 in the visit order as shown in FIG. 6.

In some implementations, path planning process 10 may apply 230 a path planning methodology to obtain a path between a plurality of neighboring nodes that are not directly connected. In some implementations, path planning process 10 may apply 230 a path planning algorithm to connect all the remaining connections in the visit order. For example, path planning process 10 may use or apply 230 the normal path planning algorithm (e.g. Rapidly Exploring Random Tree (RRT)) to find paths between the nodes that are not directly connected in the visiting order. Referring again to FIG. 6 and in some implementations, path planning process 10 may apply the path planning methodology to obtain a path between node Home 402 and node D 410. In some implementations, path planning process may apply the path planning methodology to different paths in parallel and/or with multiple threads.

Figure 7:
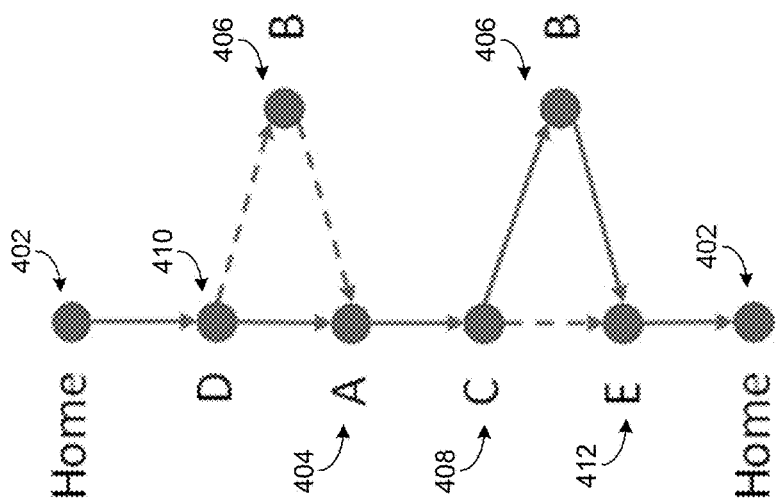

In some implementations, path planning process 10 may re-insert 232 the at least one removed node after a plurality of candidate nodes. For example, path planning process 10 may re-insert each of the previously removed 226 nodes back into to the visit order by trying to insert the at least one removed node after a number of candidate nodes and determining which candidate node yields the shortest overall path. The insertion process may also use the path planning methodology to ensure that a path is feasible. In some implementations, the candidate nodes may be selected based on how close they are to the node to be inserted. For example, the candidate nodes may be selected based upon, at least in part, a proximity measure. A proximity measure may generally define how close two poses or robot configurations are by taking into account both translations and orientations of a robot configuration. In this manner, the proximity measure takes into account both translational distance and angular difference between two poses or robot configurations. An example formula for the proximity measure is shown below in Equation 1.

$$\text{prox} = d + w_z a_z + w_x a_x \quad (1)$$

where d is the translation distance between the two poses; $a_z$ and $a_x$ are the angles of the z and x axes of the two poses, respectively; and $w_z$ and $w_x$ are the user-defined weighting factors for $a_z$ and $a_x$. In some implementations, $w_z$ and $w_x$ may be set to be 1.0 and 0.5, respectively, because the same angle difference in the angle of the z axes will cause more robot's movement that that of the x axes. It will be appreciated that these weighting factors may be adjusted to obtain desired outcomes. In addition, the estimated time duration or distance may take into account joint accelerations. Previously, only the joint speeds had been used, which is not only unrealistic but also did not penalize a path with smaller segments that forced the joints to start and stop multiple times. While an example of calculating the distance using the proximity measure has been described, it will be appreciated that various methodologies may be used to determine candidate nodes. Referring also to the example of FIG. 7, node B 406 may be re-inserted 232 into the visit order (e.g., visit order 700). In this example, node B 406 may be re-inserted after a first candidate node (e.g., node D 410) and a second candidate node (e.g., node C 408). In some implementations, path planning process 10 may re-insert 232 each removed node after a separate candidate node in parallel and/or using multiple threads. In the example of FIG. 7, path planning process 10 may determine that re-insertion of node B 406 after node C 408 yields a shorter overall path and node B 406 may be re-inserted after node C 408.

Figure 8:
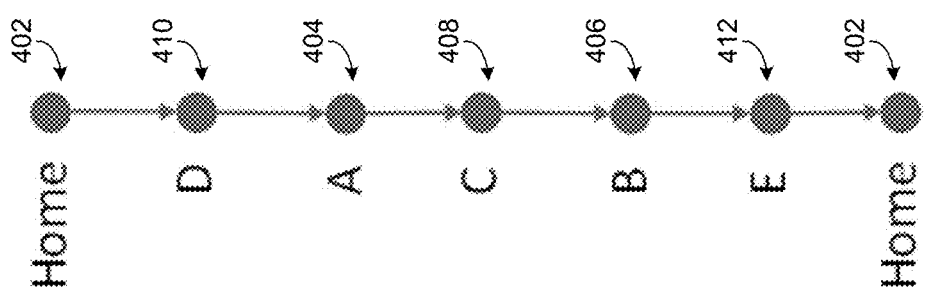
Figure 9:
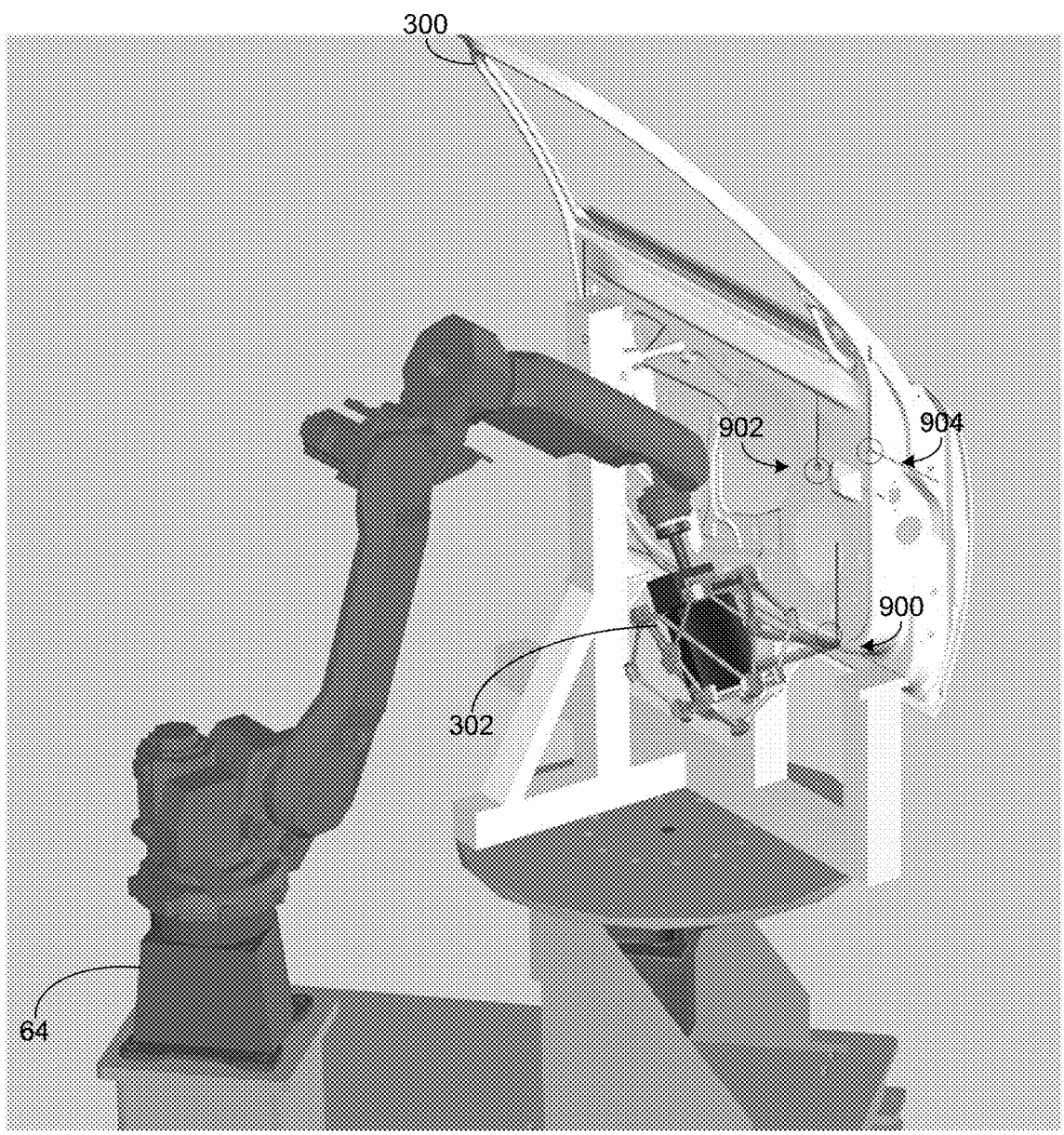
FIG. 9 is a diagrammatic view of a robotic inspection system inspecting a plurality of inspection points based upon, at least in part, a path defined according to one implementation of the path planning process of FIG. 1.

Referring also to FIG. 8 and in some implementations, after the insertions, the final visit order and path may be obtained. With the final visit order defining the path for the robotic inspection system to traverse to inspect the plurality of inspection points, path planning process 10 may inspect the plurality of inspection points. For example and as shown in FIG. 9, path planning process 10 may inspect an article or part based upon, at least in part, the obtained feasible path between inspection points. For example, path planning process 10 may direct the robotic inspection system to inspect the plurality of inspection points (e.g., inspection points 900, 902, 904) of the vehicle door (e.g., vehicle door 300) in response to obtaining the path between robot configurations using the graph as discussed above.

Figure 10:
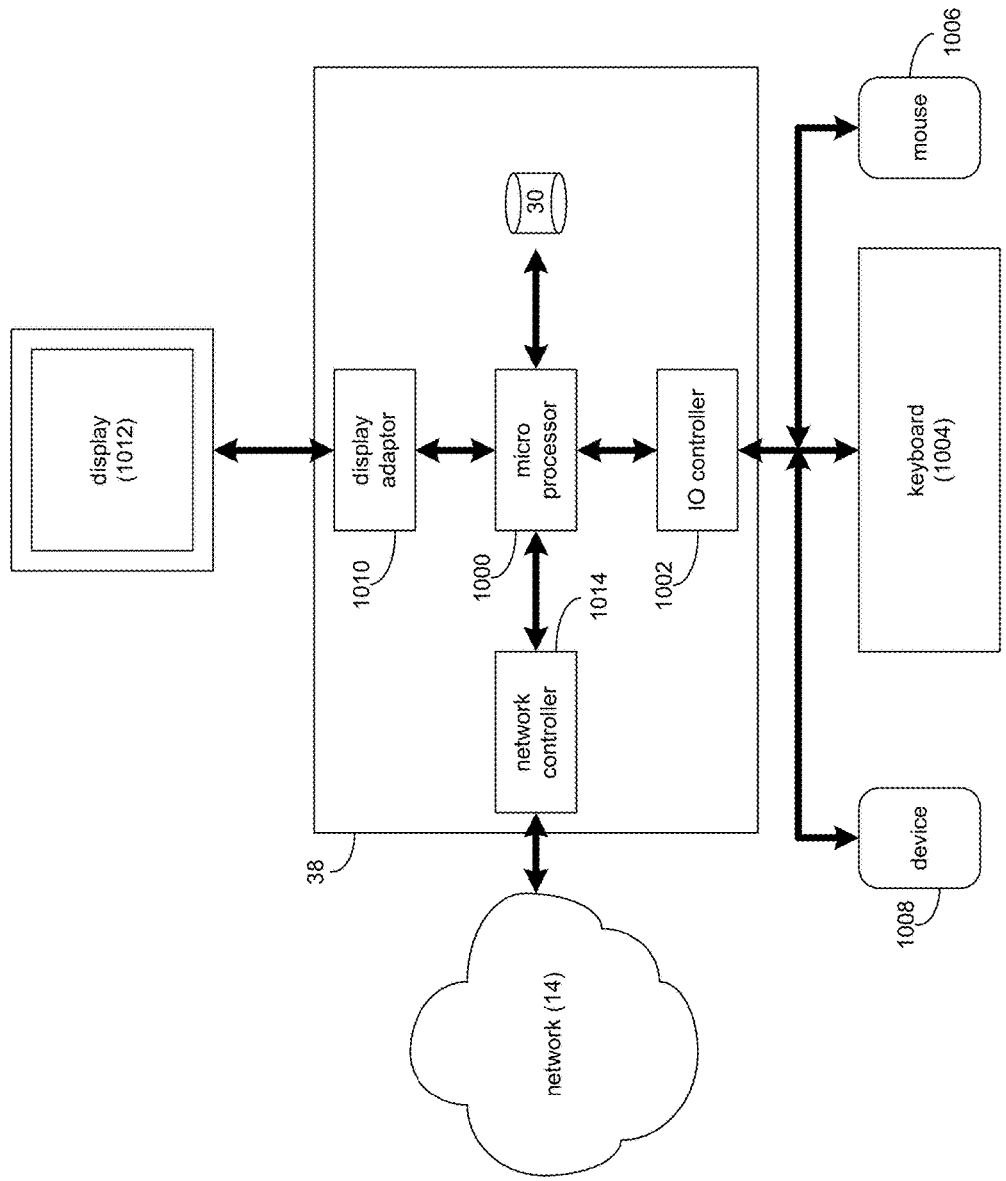
FIG. 10 is an example diagrammatic view of a client electronic device of FIG. 1 according to one or more example implementations of the disclosure.

Referring also to FIG. 10, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, path planning process 10 may be substituted for client electronic device 38 within FIG. 10, examples of which may include but are not limited to computing device 12 and/or client electronic devices 40, 42, 44.

Client electronic device 38 may include a processor and/or microprocessor (e.g., microprocessor 1000) configured to, e.g., process data and execute the above-noted code/instruction sets and subroutines. Microprocessor 1000 may be coupled via a storage adaptor (not shown) to the above-noted storage device(s) (e.g., storage device 30). An I/O controller (e.g., I/O controller 1002) may be configured to couple microprocessor 1000 with various devices, such as keyboard 1004, pointing/selecting device (e.g., mouse 1006), custom device, such a microphone (e.g., device 1008), USB ports (not shown), and printer ports (not shown). A display adaptor (e.g., display adaptor 1010) may be configured to couple display 1012 (e.g., CRT or LCD monitor(s)) with microprocessor 1000, while network controller/adaptor 1014 (e.g., an Ethernet adaptor) may be configured to couple microprocessor 1000 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method for multi-goal path planning comprising:
defining a plurality of inspection points of a problem;
identifying a plurality of robot configurations for each inspection point of the plurality of inspection points of the problem;
generating a graph with each feasible robot configuration as a node on the graph;
calculating a distance between a pair of feasible robot configurations, wherein the distance between the pair of feasible robot configurations is a measurement of time;
obtaining a shortest complete path connecting each node on the graph based upon, at least in part, the distance between the pair of feasible robot configurations, wherein obtaining the shortest complete path comprises applying, using at least one processor, a traveling salesman problem ("TSP") methodology based upon, at least in part, the graph;
obtaining a visit order from the TSP methodology;
applying, using at least one processor, a path planning methodology to obtain a path between a plurality of neighboring nodes that are not directly connected; and
controlling a robot, based upon, at least in part, the shortest complete path.

2. The method of claim 1, further comprising:
grouping at least a subset of the plurality of inspection points into a plurality of groups of inspection points.

3. The method of claim 2, wherein grouping at least a subset of the plurality of inspection points occurs prior to generating the graph.

4. The method of claim 2, wherein identifying the plurality of feasible robot configurations for each inspection point includes identifying a plurality of feasible robot configurations for each group of inspection points.

5. The method of claim 4, wherein identifying the plurality of feasible robot configurations for each group of inspection points is performed using multiple threads.

6. The method of claim 1, wherein calculating the distance comprises:
identifying a pair of robot configurations that can be directly connected without collisions;
calculating a distance between the pair of robot configurations that can be directly connected without collisions; and
generating a connection between the pair of nodes associated with the pair of robot configurations that can be directly connected without collisions.

7. The method of claim 1, wherein calculating the distance comprises:
identifying a pair of robot configurations that cannot be directly connected without a collision;
generating an artificial distance between the pair of nodes associated with the plurality of robot configurations that cannot be directly connected without collisions; and
generating a connection between the pair of nodes associated with the plurality of robot configurations that cannot be directly connected without collisions.

8. The method of claim 1, further comprising:
removing at least one node from the visit order that is not directly connected to either of a plurality of neighbor nodes;
connecting the plurality of neighboring nodes in the visit order.

9. The method of claim 1, further comprising:
re-inserting the at least one removed node after a plurality of candidate nodes.

10. The method of claim 1, wherein the problem is associated with an automotive application or a printed circuit board.

11. The method of claim 1, wherein at least one inspection point is not associated with a feasible robotic configuration.

12. A computing system including a processor and memory configured to perform operations comprising:
defining a plurality of inspection points of a problem;
identifying a plurality of robot configurations for each inspection point of the plurality of inspection points of the problem;
generating a graph with each feasible robot configuration as a node on the graph;
calculating a distance between a pair of feasible robot configurations, wherein the distance between the pair of feasible robot configurations is a measurement of time;
obtaining a shortest complete path connecting each node on the graph based upon, at least in part, the distance between the pair of feasible robot configurations, wherein obtaining the shortest complete path comprises applying, using at least one processor, a traveling salesman problem ("TSP") methodology based upon, at least in part, the graph;
obtaining a visit order from the TSP methodology;
applying, using at least one processor, a path planning methodology to obtain a path between a plurality of neighboring nodes that are not directly connected; and
controlling a robot, based upon, at least in part, the shortest complete path.

13. The computing system of claim 12, wherein operations further comprise:
grouping at least a subset of the plurality of inspection points into a plurality of groups of inspection points.

14. The computing system of claim 13, wherein grouping the at least a subset of the plurality of inspection points occurs prior to generating the graph.

15. The computing system of claim 13, wherein identifying the plurality of feasible robot configurations for each inspection point includes identifying a plurality of feasible robot configurations for each group of inspection points.

16. The computing system of claim 15, wherein identifying the plurality of feasible robot configurations for each group of inspection points is performed using multiple threads.

17. The computing system of claim 12, wherein calculating the distance comprises:
identifying a pair of robot configurations that can be directly connected without collisions;
calculating a distance between the pair of robot configurations that can be directly connected without collisions; and
generating a connection between the pair of nodes associated with the pair of robot configurations that can be directly connected without collisions.

18. The computing system of claim 12, wherein calculating the distance comprises:
identifying a pair of robot configurations that cannot be directly connected without a collision;
generating an artificial distance between the pair of nodes associated with the plurality of robot configurations that cannot be directly connected without collisions; and
generating a connection between the pair of nodes associated with the plurality of robot configurations that cannot be directly connected without collisions.

19. The computing system of claim 12, further comprising:
removing at least one node from the visit order that is not directly connected to either of a plurality of neighbor nodes;
connecting the plurality of neighboring nodes in the visit order.

20. The computing system of claim 19, further comprising:
re-inserting the at least one removed node after a plurality of candidate nodes.

21. The computing system of claim 12, wherein the problem is associated with an automotive application or a printed circuit board.

22. The computing system of claim 12, wherein at least one inspection point is not associated with a feasible robotic configuration.

23. The method of claim 1, wherein the path planning methodology includes a rapidly exploring random tree ("RRT") methodology.

24. The computing system of claim 12, wherein the path planning methodology includes a rapidly exploring random tree ("RRT") methodology.

25. The method of claim 4, wherein identifying the plurality of robot configurations for each group of inspection points is performed in parallel.

26. The system of claim 15, wherein identifying the plurality of robot configurations for each group of inspection points is performed in parallel.

27. The method of claim 1, wherein defining the plurality of inspection points of the problem comprises:
receiving the plurality of inspection points of the problem.

28. The system of claim 12, wherein defining the plurality of inspection points of the problem comprises:
receiving the plurality of inspection points of the problem.

29. The method of claim 27, wherein the plurality of inspection points of the problem are received from a user interface.

30. The method of claim 1, wherein the plurality of inspection points of the problem are defined by a processor.

31. The method of claim 1, wherein the plurality of robot configurations comprise a plurality of robot poses.

32. The system of claim 12, wherein the plurality of robot configurations comprise a plurality of robot poses.

33. The method of claim 1, wherein the plurality of robot configurations comprise a plurality of robot arm poses.

34. The system of claim 12, wherein the plurality of robot configurations comprise a plurality of robot arm poses.

* * * * *